() United States Patent  (10) Patent No.: US 8,233,496 B2
Sindhu et al. (45) Date of Patent: *Jul. 31, 2012

(54) SYSTEMS AND METHODS FOR EFFICIENT MULTICAST HANDLING

(75) Inventors: Pradeep Sindhu, Los Altos Hills, CA (US); Debashis Basu, San Jose, CA (US); Pankaj Patel, Cupertino, CA (US); Raymond Lim, Los Altos Hills, CA (US); Avanindra Godbole, San Jose, CA (US); Tatao Chuang, San Jose, CA (US); Chi-Chung K. Chen, Cupertino, CA (US); Jeffrey G. Libby, Cupertino, CA (US); Dennis Ferguson, Palo Alto, CA (US); Philippe Lacroute, Sunnyvale, CA (US); Gerald Cheung, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/723,172

(22) Filed: Mar. 12, 2010

(65) Prior Publication Data

US 2010/0165990 A1 Jul. 1, 2010

Related U.S. Application Data

(63) Continuation of application No. 11/854,001, filed on Sep. 12, 2007, now Pat. No. 7,710,994, which is a continuation of application No. 10/206,999, filed on Jul. 30, 2002, now Pat. No. 7,289,503.

(60) Provisional application No. 60/394,660, filed on Jul. 10, 2002.

(51) Int. Cl.
*H04J 3/26* (2006.01)
(52) U.S. Cl. .................. 370/432; 370/392; 370/400
(58) Field of Classification Search ................... None
See application file for complete search history.

(56) References Cited

U.S. PATENT DOCUMENTS

| 4,813,038 | A | 3/1989 | Lee |
| 6,317,434 | B1 | 11/2001 | Deng |
| 6,542,502 | B1 * | 4/2003 | Herring et al. ............... 370/390 |
| 6,625,773 | B1 * | 9/2003 | Boivie et al. ................. 714/749 |
| 6,724,761 | B1 | 4/2004 | Moy-Yee et al. |
| 6,751,219 | B1 * | 6/2004 | Lipp et al. .................... 370/390 |
| 6,870,844 | B2 | 3/2005 | Tuck et al. |
| 6,937,608 | B1 | 8/2005 | Deng |
| 6,973,082 | B2 * | 12/2005 | Devi et al. ..................... 370/390 |

(Continued)

OTHER PUBLICATIONS

Co-pending U.S. Appl. No. 11/854,001, filed Sep. 12, 2007 entitled "Systems and Methods for Efficient Multicast Handling" by Pradeep Sindhu et al., 31 pages.

*Primary Examiner* — Bob Phunkulh
(74) *Attorney, Agent, or Firm* — Harrity & Harrity, LLP (57) ABSTRACT

A network device constructs a notification corresponding to a received multicast data unit, where the notification includes administrative data associated with the multicast data unit that does not include a payload of the multicast data unit. The network device replicates the notification at least three different processing elements at different locations in a processing path of the network device to produce multiple replicated data items and produces a copy of the multicast data unit for each of replicated notifications. The network device forwards each copy of the multicast data unit towards a multicast destination.

20 Claims, 9 Drawing Sheets

U.S. PATENT DOCUMENTS

| | | |
|---|---|---|
| 7,107,334 B1 * | 9/2006 | Shaffer et al. ................ 709/224 |
| 7,206,310 B1 | 4/2007 | Chen et al. |
| 7,289,503 B1 | 10/2007 | Sindhu et al. |
| 7,468,975 B1 * | 12/2008 | Davis ........................... 370/389 |
| 2002/0126669 A1 | 9/2002 | Tuck et al. |
| 2002/0126671 A1 | 9/2002 | Ellis et al. |
| 2003/0091021 A1 | 5/2003 | Trossen et al. |
| 2003/0189942 A1 | 10/2003 | Sawey |

* cited by examiner

SYSTEMS AND METHODS FOR EFFICIENT MULTICAST HANDLING

RELATED APPLICATION

This application is a continuation of U.S. application Ser. No. 11/854,001, filed Sep. 12, 2007 which is a continuation of U.S. application Ser. No. 10/206,999, filed Jul. 30, 2002 which claims priority under 35 U.S.C. §119 based on U.S. Provisional Application No. 60/394,660, filed Jul. 10, 2002, the entire disclosures of which are incorporated herein by reference.

BACKGROUND OF THE INVENTION

1. Field of the Invention

The present invention relates generally to data transfer and, more particularly, to systems and methods for multicasting packets of information.

2. Description of Related Art

Routers receive data on physical media, such as optical fiber, analyze the data to determine its destination, and output the data on physical media in accordance with the destination. Routers were initially designed using a general purpose processor executing large software programs. As line rates and traffic volume increased, however, general purpose processors could not scale to meet these new demands. For example, as functionality was added to the software, such as accounting and policing functionality, these routers suffered performance degradation. In some instances, the routers failed to handle traffic at line rate when the new functionality was turned on.

To meet the new demands, purpose-built routers were designed. Purpose-built routers were planned and constructed with components optimized for routing. They not only handled higher line rates and higher network traffic volume, but also added functionality without compromising line rate performance.

A purpose-built router may include a number of input and output ports from which it transmits and receives information packets. A switching fabric or other transmission medium may be implemented in the router to carry the packets between the ports. In a high-performance purpose-built router, the switching fabric may transmit a large amount of information between a number of internal components.

Typically, purpose-built routers may be required to "multicast" information (i.e., send the same data from one source to multiple receivers). The nature of multicasting may, however, place uneven demands on certain resources within the router. Also, multicasting may adversely impact the quality of service (i.e., queuing delays or jitter) of the router.

Therefore, there is a need in the art to more efficiently implement multicasting within routers.

SUMMARY OF THE INVENTION

Systems and methods consistent with the principles of the invention address this and other needs by implementing efficient multicast routing within a network device, such as a router, in which drops (i.e., dropping traffic as a result of excessive network traffic or "bottlenecks"), which may affect other device traffic, can be reduced. Multicasting requires the replication of a single incoming packet to multiple outgoing multicast packets. If this replication is performed at a single location within the network device, the multiplication of data at that point may "bottleneck" traffic and cause severe drops. Systems and methods consistent with the invention may replicate packets at multiple points throughout the network device to alleviate such potential "bottlenecks." By replicating multicast packets at multiple locations within a network device, efficient handling of multicast packets results, thereby improving the packet handling performance of the network device.

In accordance with one aspect of the invention as embodied and broadly described herein, a method includes constructing a data item corresponding to a received multicast data unit and replicating the data item at least three different processing elements at different locations in a processing path of one network device to produce multiple replicated data items. The method further includes producing a copy of the multicast data unit for each of replicated data items and forwarding each copy of the multicast data unit towards a multicast destination from the one network device.

In another implementation consistent with principles of the invention, a network device includes means for constructing a notification corresponding to a received multicast data unit, where the notification includes administrative data associated with the multicast data unit that does not include a payload of the multicast data unit. The network device further includes means for replicating the notification at least three different processing elements at different locations in a processing path of the network device to produce multiple replicated data items and means for producing a copy of the multicast data unit for each of replicated notifications. The network device also includes means for forwarding each copy of the multicast data unit towards a multicast destination.

In still another implementation consistent with principles of the invention, a method includes receiving a multicast data unit at a single network device; replicating the multicast data unit at two or more locations in a processing path within the single network device to produce replicated multicast data units; determining a network destination for each of the replicated multicast data units; and forwarding each of the replicated multicast data units to its determined network destination from the single network device.

In another implementation consistent with principles of the invention, a network device includes an interface configured to receive a multicast data unit. The network device further includes a processing path configured to replicate the multicast data unit at least three locations in the processing path to produce replicated multicast data units, determine a network destination for each of the replicated multicast data units, and forward each of the replicated multicast data units to its determined network destination.

In yet another implementation consistent with principles of the invention, a method includes replicating a data item associated with a multicast packet to multiple outgoing packet forwarding engines of a network device to produce first replicated data items, replicating the data item associated with the multicast packet to multiple data streams in the network device to produce second replicated data items, and replicating the data item associated with the multicast packet to multiple logical interfaces in a same stream of the multiple data streams to produce third replicated data items. The method further includes generating a copy of the multicast packet for each of the replicated first, second and third data items and forwarding each copy of the multicast packet from the network device to its respective network destination.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

Systems and methods consistent with the principles of the invention implement efficient multicasting in a network device that reduces the potential for the occurrence of drops. By replicating multicast packets at multiple locations within a network device, the "bottlenecking" of traffic that may occur if multicast packets are replicated at a single location may be avoided. Packet handling performance of a network device employing efficient multicasting consistent with the principles of the invention may, thus, be improved.

Exemplary Network Device

Figure 1:
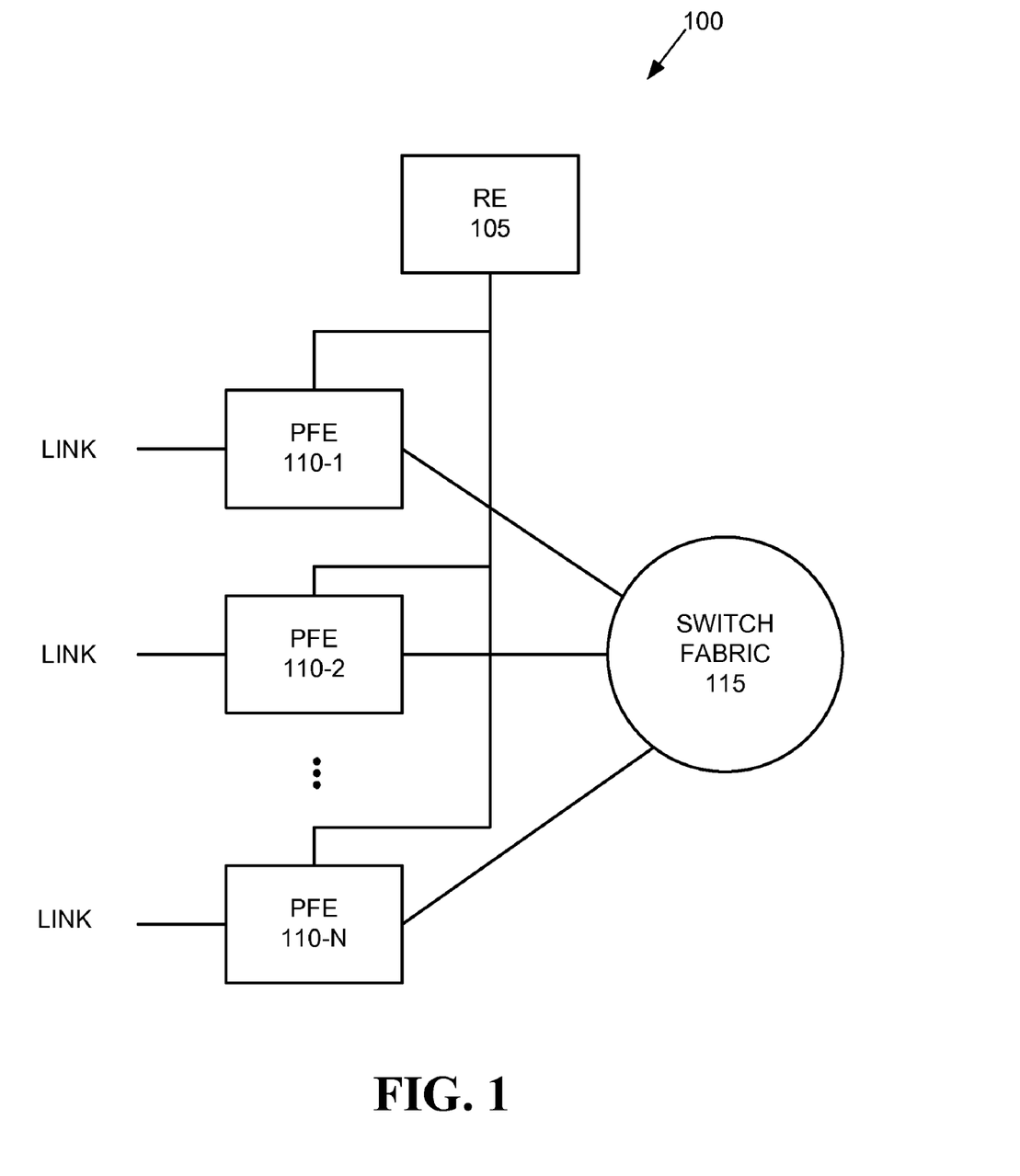
FIG. 1 is a diagram of an exemplary network device in which systems and methods consistent with the principles of invention may be implemented.

FIG. 1 is a diagram of an exemplary network device in which systems and methods consistent with the principles of the invention may be implemented. The principles of the invention will be described in terms of packets, but also apply to the flow of any type of data unit. In this particular implementation, the network device takes the form of a router 100. Router 100 may receive one or more data streams from a physical link, process the data stream(s) to determine destination information, and transmit the data stream(s) on one or more links in accordance with the destination information.

Router 100 may include a routing engine (RE) 105 and multiple packet forwarding engines (PFEs) 110 interconnected via a switch fabric 115. Switch fabric 115 may include one or more switching planes to facilitate communication between two or more of PFEs 110. In one implementation consistent with the principles of the invention, each of the switching planes includes a three-stage switch of crossbar elements.

RE 105 may include processing logic that performs high-level management functions for router 100. For example, RE 105 may communicate with other networks and systems connected to router 100 to exchange information regarding network topology. RE 105 may create routing tables based on the network topology information and forwarding tables based on the routing tables. RE 105 may install the forwarding tables in PFEs 110. PFEs 110 may use the forwarding tables to perform route lookup for incoming packets. RE 105 may also perform other general control and monitoring functions for router 100.

Each of PFEs 110 connects to RE 105 and switch fabric 115. PFEs 110 receive data on physical links connected to a network, such as a wide area network (WAN), local area network (LAN), or a wireless network. Each physical link could be one of many types of transport media, such as optical fiber or Ethernet cable. The data on the physical link may be formatted according to one of several protocols, such as the synchronous optical network (SONET) standard, asynchronous transfer mode (ATM) technology, or Ethernet.

Exemplary Incoming PFE

Figure 2:
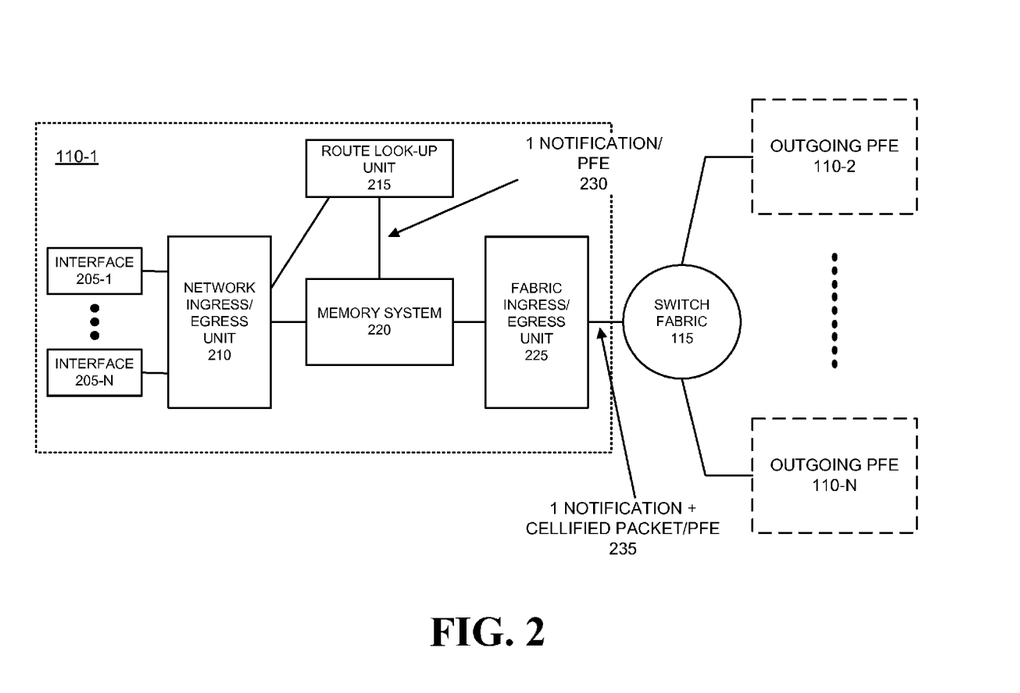
FIG. 2 is a diagram of an exemplary incoming packet forwarding engine (PFE) according to an implementation consistent with the principles of invention.

FIG. 2 is an exemplary diagram of an incoming PFE 110-1 according to an implementation consistent with the principles of the invention. Incoming PFE 110-1 may include one or more interfaces 205, a network ingress/egress unit 210, a route look-up unit 215, a memory system 220, and a fabric ingress/egress unit 225. Interfaces 205 may couple to links that are further connected to a network, and may receive and transmit packets to and from the network. Network ingress/egress unit 210 may include logic for receiving packets from interfaces 205, fragmenting each of the packets into cells (i.e., fixed size internal data units used by PFEs 110), creating a notification for each of the packets, passing each of the notifications to route look-up unit 215, and passing the cellified packet to memory system 220 for temporary storage. Each notification may include a collection of control information associated with a packet that further includes information necessary for routing the packet and a pointer for the packet data. Each notification includes data from the packet header that can be used by route look-up unit 215 to determine a route for the corresponding packet. The route may include a multicast route. Route look-up unit 215 may replicate each notification for each multicast destination that corresponds to a different outgoing PFE (110-2 through 110-N). Route look-up unit 215 may pass the notification through memory system 220 and fabric ingress/egress unit 225, along with the cellified packet, to switch fabric 115. Switch fabric 115 may pass each notification, and each corresponding cellified packet, to an appropriate outgoing PFE 110.

Exemplary Outgoing PFE

Figure 3:
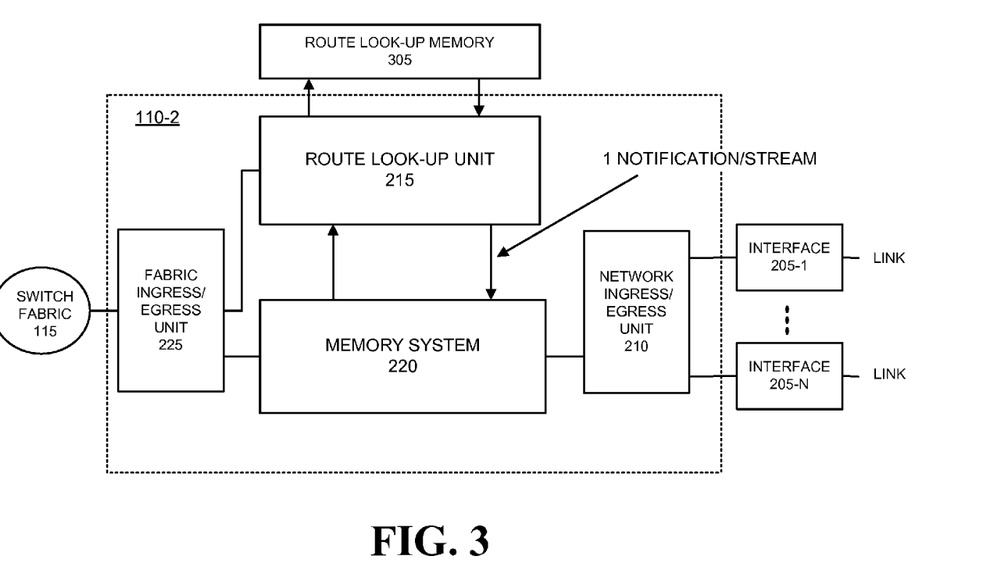
FIG. 3 is a diagram of an exemplary outgoing packet forwarding engine (PFE) according to an implementation consistent with the principles of invention.

FIG. 3 is a diagram of a portion of an outgoing PFE 110-2 according to an implementation consistent with the principles of the invention. Outgoing PFE 110-2 may include similar components to incoming PFE 110-1, such as fabric ingress/egress unit 225, memory system 220, network ingress/egress unit 210 and route look-up unit 215. Route look-up unit 215 may connect to route look-up memory 305. Route look-up memory 305 may store multicast lists used for forwarding multicast packets. The portion of outgoing PFE 110-2 detailed in FIG. 3 facilitates the replication of multicast packets for transmission on one or more outgoing links.

Fabric ingress/egress unit 225 of outgoing PFE 110 may receive the notifications, and their corresponding cellified packets, and may pass the notifications to route look-up unit 215, and the cellified packets for storage in memory system 220. Route look-up unit 215 may retrieve a multicast list from route look-up memory 305 based on each received notification. Route look-up unit 215 may then replicate each notification for each multicast destination included in a corresponding multicast list. For multicast to different logical interfaces belonging to the same physical interface (e.g., virtual circuit, VLAN), route look-up unit 215 may set a bit (SSMCTS) in the notification and may send a multicast count (MCCNT) along with the notification. Route look-up unit 215 may pass the replicated notifications to memory system 220. Memory system 220 may store cellified packets received from fabric ingress/egress unit 225, and may additionally queue each of the notifications received from route look-up unit 215. Memory system 220 may further dequeue each of the queued notifications according to, for example, a weighted round robin scheme, replicate notifications requiring single stream multicast (SSMCST) (i.e., multicast to more than one destination on the same interface such as multiple virtual circuits on an ATM interface, multiple frame relay DLCI in a SONET interface, or multiple VLANs on an Ethernet interface), and pass the notifications to network ingress/egress unit 210.

Network ingress/egress unit 210 may receive the notifications, extract the cellified packet for each corresponding received notification from memory system 220, and re-form the packet. Network ingress/egress unit 210 may further replicate each packet according to a multicast count value received with each notification. Network ingress/egress unit 210 may also retrieve encapsulation data from memory (not shown) corresponding to each packet's destination, and may encapsulate each packet with the retrieved encapsulation data. The encapsulated packets may be passed to an appropriate interface 205 for forwarding out a link to the external network (not shown).

Figure 4:
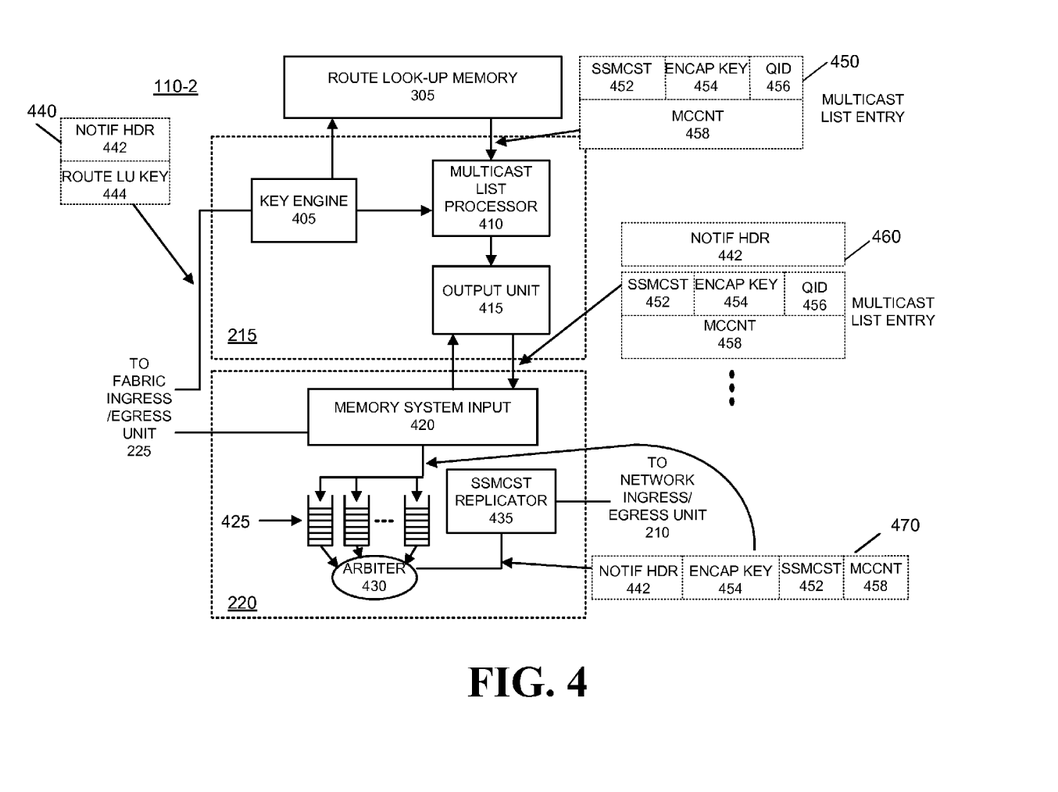
FIG. 4 is a diagram of exemplary components of the route look-up engine and memory system of the outgoing packet forwarding engine (PFE) of FIG. 3 according to an implementation consistent with the principles of invention.

FIG. 4 is a detailed diagram of exemplary components of route look-up unit 215 and memory system 220 of an outgoing PFE (e.g., PFE 110-2) according to an implementation consistent with the principles of the invention. Route look-up unit 215 may include a key engine 405, a multicast list processor 410 and an output unit 415. Key engine 405 may receive a notification 440 from network ingress/egress unit 210 or fabric ingress/egress unit 225. Notification 440 may include, among other things, a notification header 442 and a route look-up key 444. Notification header 442 may include, for example, administrative data identifying the packet associated with header 442.

Key engine 405 may use route look-up key 444 to retrieve an address pointer from route look-up memory 305 that points to a multicast list in memory 305. Multicast list processor 410 may receive the address pointer from key engine 405, and may use the address pointer to retrieve a multicast list from route look-up memory 305. Each entry 450 in the multicast list may include an encapsulation key 454 that may be used to retrieve encapsulation data that includes next hop data, and a queue identifier (QID) 456 that includes a number representing a queue 425 in memory system 220. Each entry 450 in the multicast list may further include a same stream multicast (SSMCST) value 452 that indicates whether same stream multicast is required, and a multicast count (MCCNT) value 458 that indicates a number of times a notification should be replicated on the same stream. Output unit 415 may generate and pass a notification 460 to memory system input 420 of memory system 220. Notification 460 may include a notification header 442, and a multicast list each entry of which can include SSMCST value 452, encapsulation key 454, QID value 456 and MCCNT value 458.

Memory system 220 may include memory system input 420, multiple queues 425, arbiter 430, and a SSMCST replicator 435. Memory system input 420 may receive notification 460 from output unit 415 and may replicate one notification 460 for each destination QID 456 in the multicast list. Memory system input 420 may then modify each replicated notification 460 to create one notification 470 per multicast list entry, and send each notification 470 to a different queue corresponding to the notification's QID value 456. Notification 470 may include a notification header 442, encapsulation key 454, SSMCST value 452, and MCCNT value 458. Each queue of queues 425 may be associated with an outgoing stream or another PFE, and may store received notifications in a FIFO manner. Arbiter 430 may dequeue each notification 470 using a weighted round robin, or other, arbitration scheme, and pass each dequeued notification to SSMCST replicator 435. SSMCST replicator 435 may receive each dequeued notification 470, replicate each notification 470 according to SSMCST value 452, increment each encapsulation key value 454 for each replicated notification 470, and pass each notification 470 to network ingress/egress unit 210 for forwarding to an outgoing interface 205.

Exemplary Multicasting Process

FIGS. 5-9 illustrate an exemplary process for handling multicast packets in a manner consistent with the principles of the invention. FIGS. 2 and 4 further illustrate the implementation of the exemplary process of FIGS. 5-9 within an incoming PFE 110-1 and outgoing PFE (e.g., PFEs 110-2 through 110-N) of router 100 consistent with the principles of the invention. The exemplary multicast scheme may reduce the possibility of drops affecting other traffic by replicating notifications/packets at multiple points in router 100.

Figure 5:
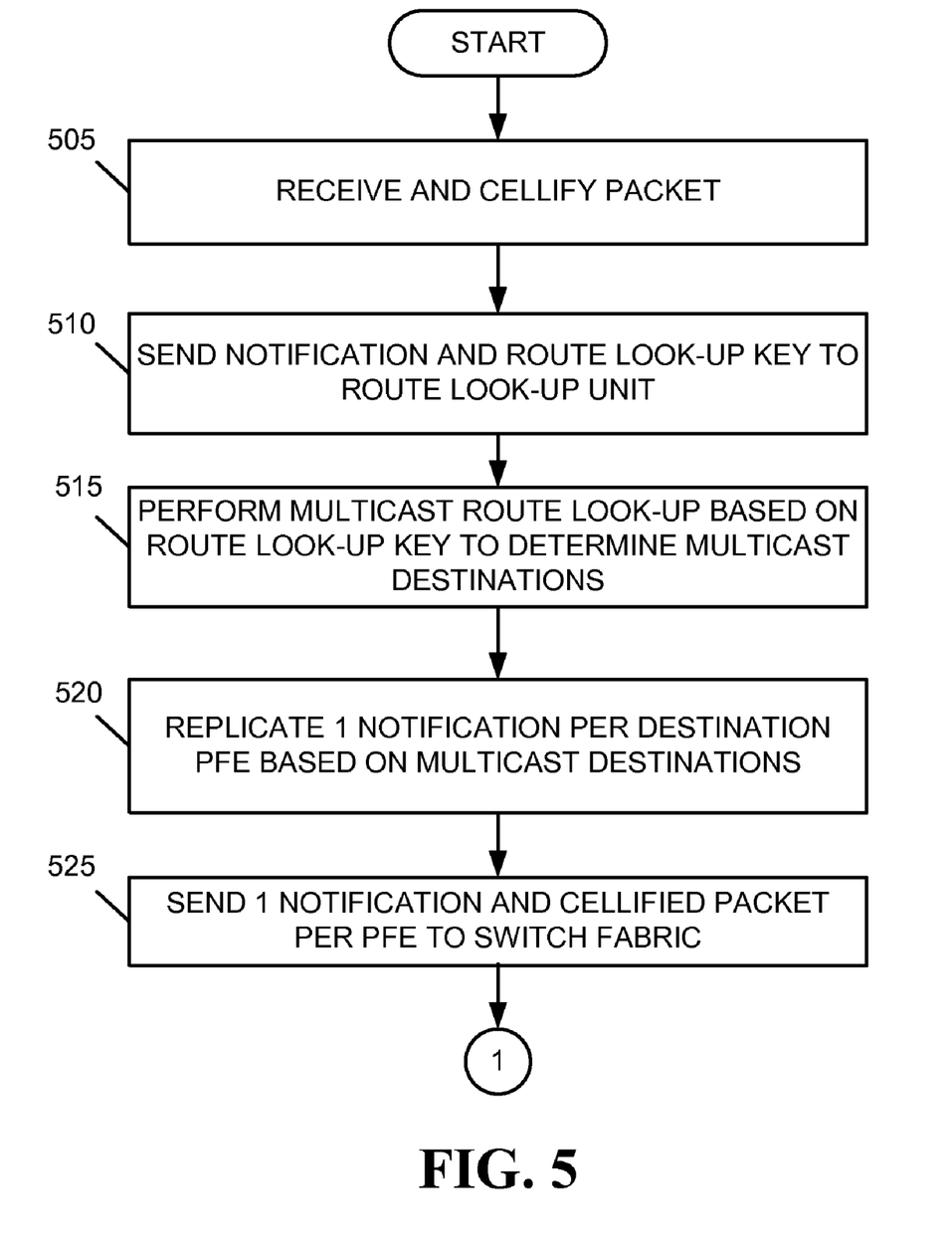
FIGS. 5-9 are flow charts illustrating an exemplary multicast process according to an implementation consistent with the principles of the invention.

The exemplary process may begin with network ingress/egress unit 210 receiving and cellifying an incoming packet [act 505](FIG. 5). Cellification of an incoming packet may include, for example, fragmenting the packet into one or more fixed length cells. Network ingress/egress unit 210 may send a notification that includes a route look-up key to route look-up unit 215 [act 510]. Route look-up unit 215 may perform multicast route look-up based on the route look-up key to determine multicast destinations for the packet [act 515]. For example, to determine multicast destinations for the packet, key engine 405 of route look-up unit 215 may convert the route look-up key to an address pointer that points to a location of a multicast list in route look-up memory 305. Key engine 405 may then pass the address pointer to multicast list processor 410 and multicast list processor 410 may retrieve a multicast list from route look-up memory 305 using the address pointer. The route look-up may use the packet destination data from the route look-up key to determine the appropriate outgoing PFEs 110 that correspond to each multicast destination. Route look-up unit 215 may replicate one notification per outgoing PFE based on the determined multicast destinations [act 520](see 230, FIG. 2). Route look-up unit 215 may send one notification and cellified packet data per outgoing PFE to switch fabric 115 via memory system 220 and fabric ingress/egress unit 225 [act 525] (see 235, FIG. 2).

Figure 6:
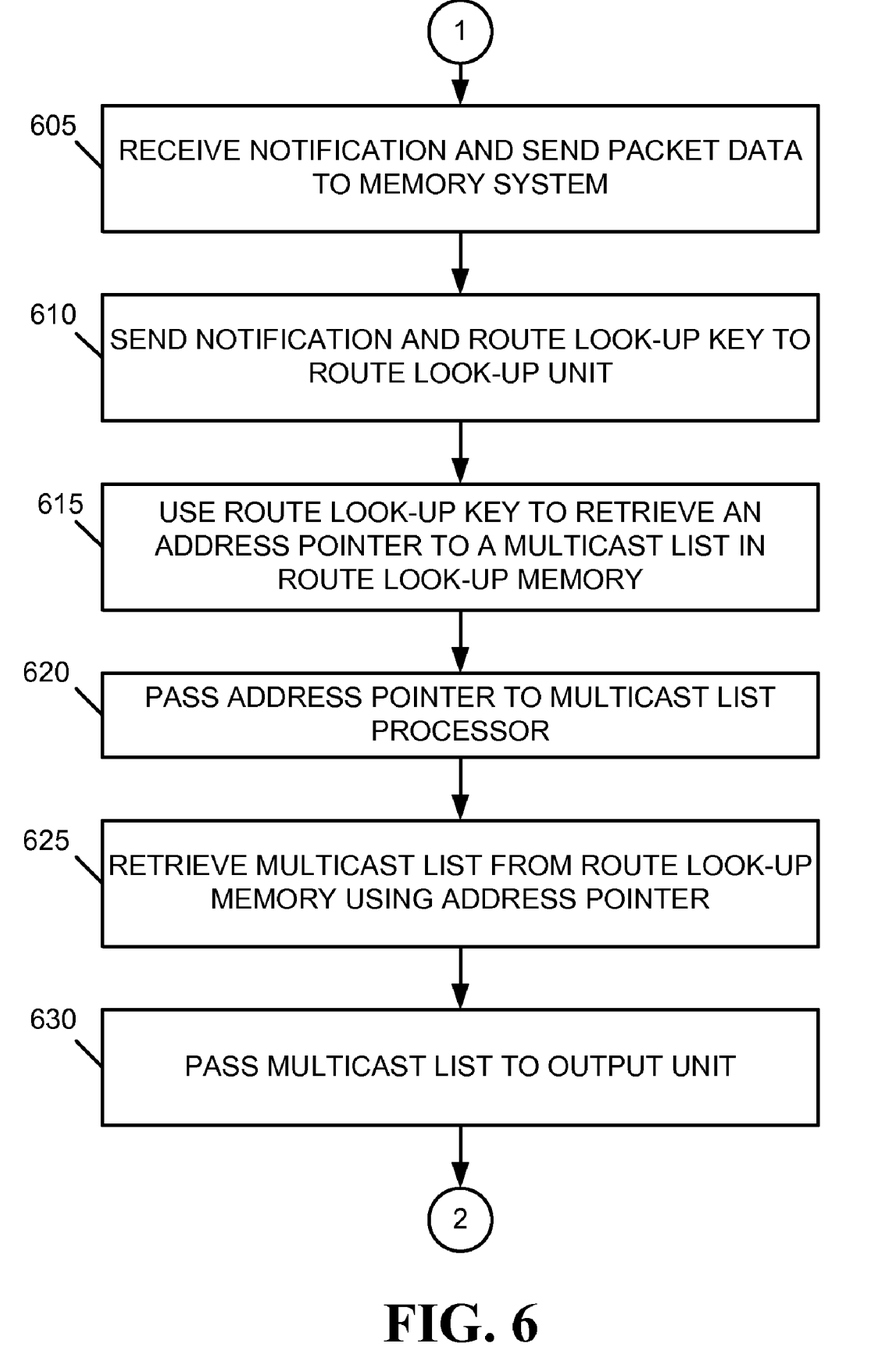

A fabric ingress/egress unit 225 of an outgoing PFE (e.g., 110-2) may receive a notification from switch fabric 115 and may send the associated cellified packet data to memory system 220 [act 605](FIG. 6). Fabric ingress/egress unit 225 may send a notification 440 to route look-up unit 215 [act 610]. Notification 440 may include notification header 442 and route look-up key 444. Key engine 405 of route look-up unit 215 may use the route look-up key 444 to retrieve an address pointer that points to a multicast list in route look-up memory 305 [act 615]. For example, key engine 405 may convert route look-up key 444 to an address pointer that points to a location of a multicast list in route look-up memory 305.

Key engine 405 may then pass the address pointer to multicast list processor 410 [act 620]. Multicast list processor 410 may retrieve a multicast list from route look-up memory 305 using the address pointer [act 625]. The multicast list may include multiple entries 450, each of which may include a single stream multicast (SSMCST) value 452, an encapsulation key 454, a QID value 456, and a multicast count (MC-CNT) value 458. SSMCST value 452 may indicate whether same stream multicast is required. Encapsulation key 454 may be utilized to retrieve encapsulation data that includes next hop data. QID value 456 may include a number representing a queue 425 in memory system 220. MCCNT value 458 may indicate a number of times a notification should be replicated on the same stream. Each queue in memory system 220 may be associated with an outgoing stream or another PFE.

Figure 7:
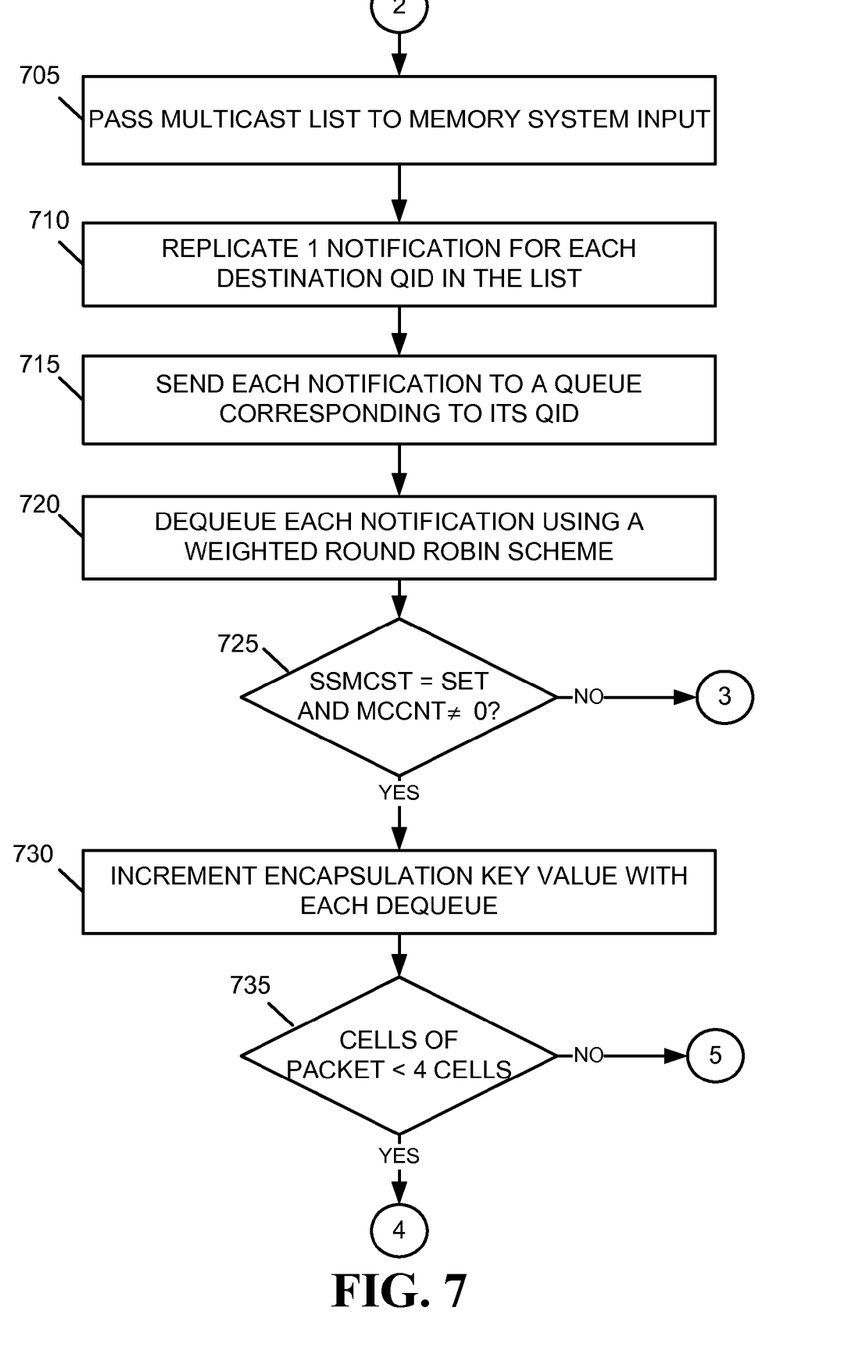

Multicast list processor 410 may pass the multicast list to output unit 415 [act 630]. Output unit 415 may generate a notification 460 and pass the notification to memory system input 420 [act 705] (FIG. 7). Notification 460 may include notification header 442 and multicast list entries of the multicast list, with each entry including SSMSCT value 452, encapsulation key 454, QID value 456, and MCCNT 458. Memory system input 420 may replicate 1 notification 460 for each destination QID 456 in the multicast list [act 710]. Memory system input 420 may then replicate notification header 442 and append portions of an entry of the multicast list, including encapsulation key 454 and MCCNT 458 to the notification header 442 to create one notification 470 per multicast list entry. Memory system input 420 may send each notification 470 to a queue 425 corresponding to its QID value 456 [act 715]. Arbiter 430 may dequeue each notification 470 using a weighted round robin scheme [act 720].

Figure 8:
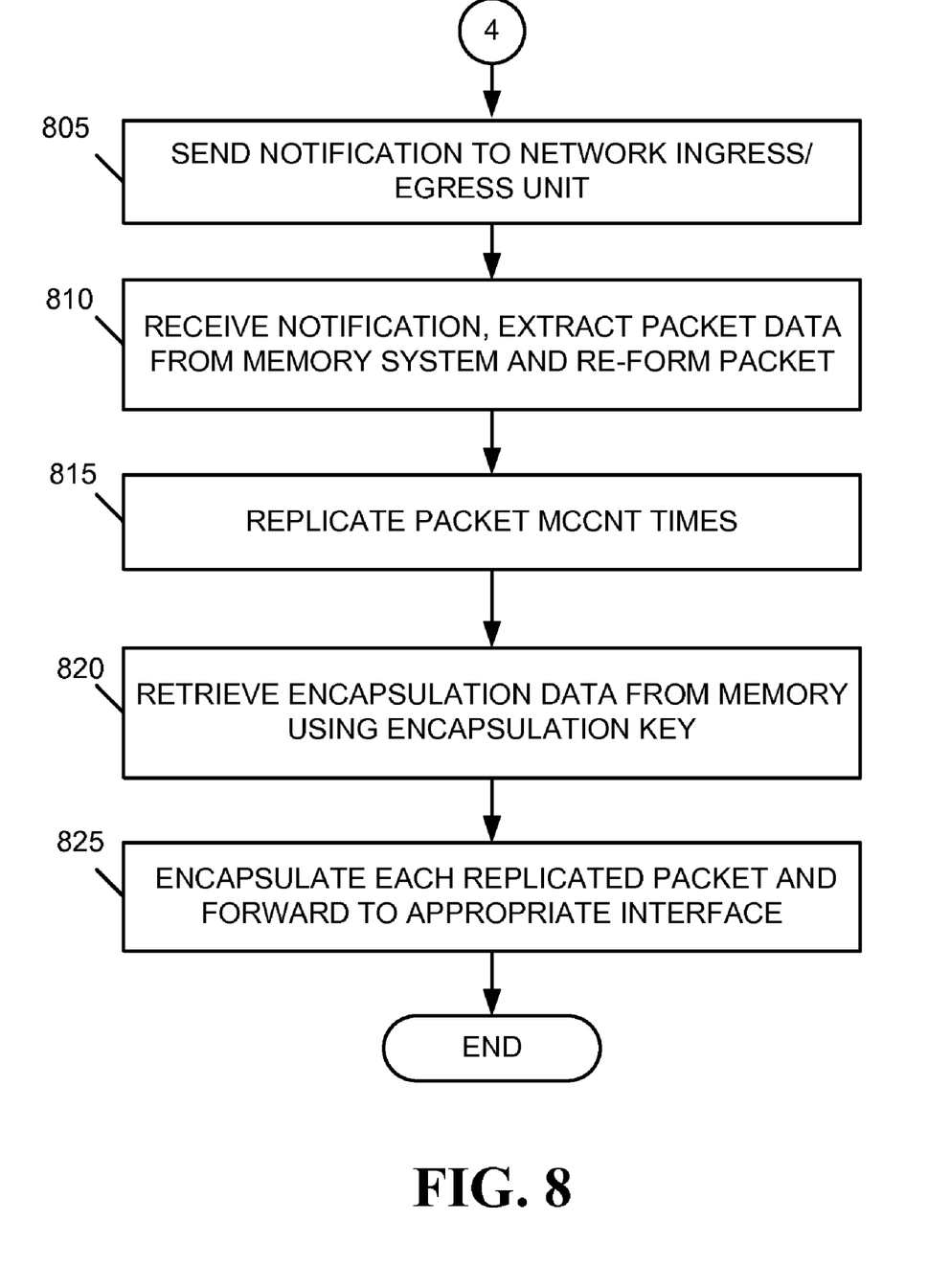
Figure 9:
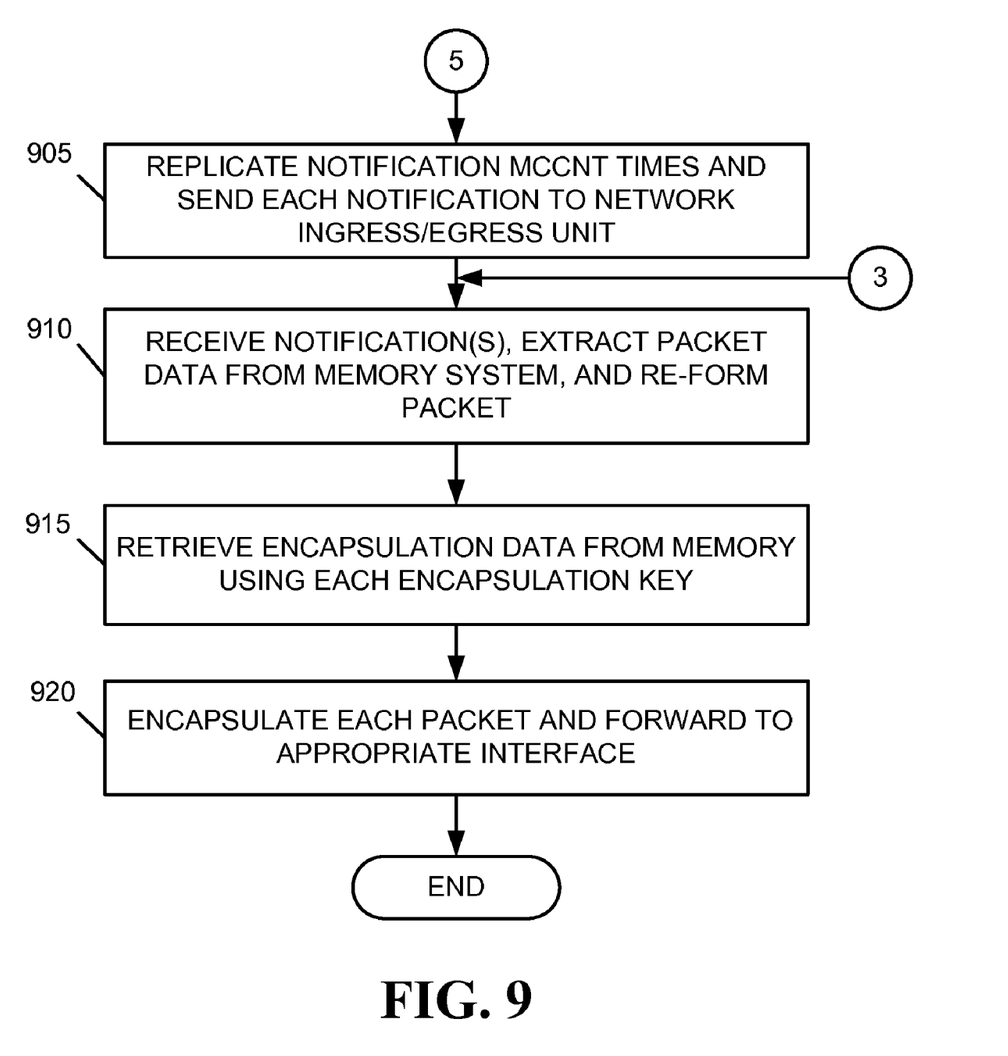

SSMCST replicator 355 may receive each dequeued notification 470 and determine if SSMCST 452 is set, indicating the need to replicate the corresponding packet for different destinations on the same physical interface, and whether MCCNT 458 is not equal to zero [act 725]. If not, single stream multicasting is not required and the exemplary process may continue at act 910 below (FIG. 9). If SSMCST 452 is set and MCCNT 458 is equal to a value other then zero, then SSMCST replicator 435 may increment encapsulation key value 454 with each dequeue of a notification 470 [act 730]. SSMCST replicator 435 may determine whether the cellified packet data associated with each notification 470 includes less then four cells [act 735]. If so, SSMCST replicator 435 may send the notification 470 to network ingress/egress unit 210 [act 805](FIG. 8). Network ingress/egress unit 210 may receive the notification 470, extract corresponding packet data from memory system 220, and re-form the packet [act 810]. Network ingress/egress unit 210 may replicate the packet a number of times indicated by MCCNT 458 [act 815]. Network ingress/egress unit 210 may retrieve encapsulation data from memory (not shown) using encapsulation key 454 [act 820]. For example, encapsulation key 454 may be translated to a location of encapsulation data in a memory (not shown) coupled to network ingress/egress unit 210. The encapsulation data may include packet header data corresponding to the packet's next hop destination. Network ingress/egress unit 210 may encapsulate each replicated packet with the retrieved encapsulation data and forward the packet to an appropriate outgoing interface 205 [act 825].

Returning to act 730 of FIG. 7, if the cellified packet data includes four or more cells, then SSMCST replicator 435 may replicate the notification a number of times indicated by MCCNT 458 and send each notification to network ingress/egress unit 210 [act 905](FIG. 9). Network ingress/egress unit 210 may receive the notification(s), extract corresponding packet data from memory system 220, and re-form the packet [act 910]. In the case of single stream multicast, the packet may be re-formed and replicated MCCNT times. Network ingress/egress unit 210 may retrieve encapsulation data from memory using each encapsulation key [act 915]. Network ingress/egress unit 210 may encapsulate each packet and forward the packet to an appropriate outgoing interface 205 [act 920]. Network ingress/egress unit 210 may replicate packets that include less than four cells, as opposed to having SSMCST replicator 435 replicate the packet, because, when memory system 220 includes, for example, four memory banks, a packet with fewer than four cells does not use all memory banks and can cause an overload on some banks. Replication of packets of less than four cells by network ingress/egress unit 210, thus, avoids "hot spots" in memory system 220 when a short packet is multicast many times.

CONCLUSION

Consistent with the principles of the present invention, an efficient multicast process may be implemented that improves the packet handling performance of a network device. Multicasting requires the replication of a single incoming packet to multiple outgoing multicast packets. "Bottlenecking," which may cause severe drops, may occur if this replication is performed at a single location within the network device. Systems and methods consistent with the invention may replicate packets at multiple points throughout the network device to alleviate such potential "bottlenecks," thereby, improving the network device's overall performance.

Although described in the context of a purpose-built router, concepts consistent with the principles of the invention can be implemented in any system that requires high performance data item processing. Apparatuses, systems, and methods based on the principles of the memory system and packet processor described herein may be used in any environment for processing data items associated with an entity. The data items are processed using context switching for the entities. Entities may include sources of data items, as described herein, or other entities, such as destinations, processing threads, or any other entity having individual data items that must be processed.

The foregoing description of embodiments of the present invention provides illustration and description, but is not intended to be exhaustive or to limit the invention to the precise form disclosed. Modifications and variations are possible in light of the above teachings or may be acquired from practice of the invention. For example, certain portions of the invention have been described as "logic" that performs one or more functions. This logic may include hardware, such as an application specific integrated circuit or a field programmable gate array, software, or a combination of hardware and software. While a series of acts has been described in FIGS. 5-9, the order of the acts may vary in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method comprising:
   replicating, by a network device and at a first location in the network device, a data item to produce a first replicated data item associated with a first destination in the network device,
   the data item including:
      data from a header of a packet, and
      information, associated with the network device, that is different than information included in the packet, and
   the packet to be forwarded from the network device toward a plurality of destinations in a network associated with the network device;
   at least one of:
      replicating, by the network device and at a second location in the network device, the data item to produce a second replicated data item associated with a second destination in the network device; or
      replicating, by the network device and at a third location in the network device, the data item to produce a third replicated data item associated with a third destination in the network device,
   the first location, the second location, and the third location being different one from another;
   generating by the network device:
      a first copy of the packet based on the first replicated data item,
      and at least one of;
         a second copy of the packet based on the second replicated data item, or
         a third copy of the packet based on the third replicated data item; and
   forwarding the first copy of the packet and the at least one of the second copy of the packet or the third copy of the packet toward a corresponding one of the plurality of destinations.

2. The method of claim 1, where the packet is a multicast packet, and where the data item includes information for routing the packet,
   the method further comprising:
      forwarding the first copy of the packet and the at least one of the second copy of packet or the third copy of the packet, based on the information for routing the packet, to a corresponding one of the first destination and at least one of the second destination or the third destination,
      where the first destination and the least one of the second destination or the third destination include interfaces of the network device, and
      where forwarding the first copy of the packet toward a corresponding one of the plurality of destinations includes forwarding the first copy of the packet to a corresponding one of the plurality of destinations from the first destination.

3. The method of claim 2, where the information for routing the packet is based on the data from the header of the multicast packet.

4. The method of claim 1, where generating the first copy of the packet comprises:
   generating, based on a value associated with the first replicated data item, the first copy of the packet for the first replicated data item; and
   forwarding the generated first copy of the packet to the first destination of the network device.

5. The method of claim 1, where replicating the data item to produce the first replicated data item includes:
   replicating the data item, at a first point in a processing path of the network device, to produce the first replicated data item,
   where the first location includes the first point.

6. The method of claim 5, further comprising replicating the data item to produce the second replicated data,
   where replicating the data item to produce the second replicated data item includes:
      replicating the data item, at a second point in the processing path of the network device, to produce the second replicated data item,
   where the second location includes the second point, and
   where the first point is different than the second point.

7. The method of claim 6, further comprising replicating the data item to produce the third replicated data item,
   where replicating the data item to produce the third replicated data item includes:
      replicating the data item, at a third point in the processing path of the network device, to produce the third replicated data item,
   where the third location includes the third point, and
   where the first point is different than the third point.

8. A system comprising:
   a network device to:
      replicate, at a first location in the network device, a data item, associated with a packet, to produce a first replicated data item associated with a first destination within the network device,
      the data item including:
         data from a header of the packet, and
         information, associated with the network device, that is different than information included in the packet;
      replicate, at a second location in the network device, the data item to produce a second replicated data item associated with a second destination within the network device,
      the second location being different than the first location;
      generate a first copy of the packet based on the first replicated data item;
      generate a second copy of the packet based on the second replicated data item;
      forward the generated first copy to the first destination; and
      forward the generated second copy to the second destination.

9. The system of claim 8, where the network device is further to:
   replicate the data item, at a third location in the network device, to produce a third replicated data item associated with a third destination within the network device,
   where the third location is different than the first location and the second location;
   generate, based on the third replicated data item, a third copy of the packet based on the third replicated data item;
   forward the generated third copy of the packet to the third destination within the network device; and
   forward the generated third copy of the packet from the third destination toward a destination in a network that is remote from the network device.

10. The system of claim 8, where the network device replicates the data item to produce the first replicated data item at a first processing element in a processing path of the network device,
    where the first location includes the first processing element, and where the network device replicates the data item to produce the second replicated data item at a second processing element in the processing path of the network device, and where the second location includes the second processing element, the second processing element being different than the first processing element.

11. The system of claim 8, where the packet is a multicast packet, and where the first destination and the second destination are associated with multicast destinations.

12. The system of claim 8, where the network device is to retrieve a multicast list based on the data item, and where the first destination and the second destination are identified based on the multicast list.

13. The system of claim 12, where the multicast list is retrieved from a memory of the network device, where the multicast list further includes a value indicating a number of times to replicate the data item, and where the network device is to replicate the data item to produce a third replicated data item based on the value.

14. The system of claim 8, where the network device is to forward, from a third location in the network device, the data item to the first location and the second location prior to the data item being replicated at the first location and at the second location, and where the first destination is different than the second destination.

15. A device comprising:
one or more units to:
generate a data item associated with a packet
the data item including:
data from a header of the packet, and
information, associated with the device, that is different than information included in the packet;
replicate, at a first location in the device, the data item to produce a first replicated data item associated with a first destination in the device;
replicate, at a second location in the device, the data item to produce a second replicated data item associated with a second destination in the device,
the second location being different than the first location;
generate a first copy of the packet based on the first replicated data item;
generate a second copy of the packet based on the second replicated data item;
forward the generated first copy of the packet from the first destination toward a first destination in a network that is remote from the device; and
forward the generated second copy of the packet from the second destination toward a second destination, in the network, that is different than the first destination in the network.

16. The device of claim 15, where the one or more units are further to:

replicate the data item to produce a third replicated data item associated with a third destination in the device;
generate a third copy of the packet based on the third replicated data item; and
forward the generated third copy to the third destination in the device.

17. The device of claim 16, where the one or more units are to replicate, at a third location in the device, the data item to produce the third replicated data item, where the third location is different than the first location and the second location.

18. The device of claim 15, where the one or more units are to retrieve a multicast list based on the data item, and where the first destination and the second destination, in the device, are identified based on the multicast list.

19. The device of claim 18, where the multicast list includes a value indicating a number of times to replicate the data item, and where the one or more units are to replicate the data item to produce a third replicated data item based on the value.

20. The device of claim 15, where the packet is a multicast packet, and where the first destination and the second destination, in the network, correspond to multicast destinations.

* * * * *